United States Patent
Cliffe

(10) Patent No.: US 8,889,602 B2
(45) Date of Patent: Nov. 18, 2014

(54) COPOLYMER FOR SHALE STABILIZATION AND METHOD OF USE

(75) Inventor: Stephen Cliffe, Stonehaven (GB)

(73) Assignee: M-I Drilling Fluids U.K. Limited, Aberdeen, Aberdeenshire (GB)

( * ) Notice: Subject to any disclaimer, the term of this patent is extended or adjusted under 35 U.S.C. 154(b) by 277 days.

(21) Appl. No.: 12/997,112

(22) PCT Filed: Jun. 23, 2009

(86) PCT No.: PCT/EP2009/057759
§ 371 (c)(1),
(2), (4) Date: Dec. 9, 2010

(87) PCT Pub. No.: WO2009/156372
PCT Pub. Date: Dec. 30, 2009

(65) Prior Publication Data
US 2011/0092396 A1    Apr. 21, 2011

Related U.S. Application Data

(60) Provisional application No. 61/074,919, filed on Jun. 23, 2008.

(51) Int. Cl.
| | |
|---|---|
| C09K 8/60 | (2006.01) |
| C09K 8/05 | (2006.01) |
| C09K 8/36 | (2006.01) |
| E21B 43/16 | (2006.01) |
| C09K 8/12 | (2006.01) |
| C09K 8/24 | (2006.01) |

(52) U.S. Cl.
CPC ... C09K 8/12 (2013.01); C09K 8/24 (2013.01); C09K 2208/12 (2013.01)
USPC ......... 507/222; 507/100; 507/120; 166/305.1

(58) Field of Classification Search
CPC ............ C09K 8/02; C09K 8/03; C09K 8/035; C09K 8/04; C09K 8/12; C09K 8/18; C09K 8/22; C09K 8/24; C09K 8/608; C09K 2208/12

USPC .................................. 507/100, 120, 222, 240
See application file for complete search history.

(56) References Cited

U.S. PATENT DOCUMENTS

| | | | | |
|---|---|---|---|---|
| 4,554,081 | A * | 11/1985 | Borchardt et al. | 507/121 |
| 6,020,289 | A * | 2/2000 | Dymond | 507/120 |
| 2002/0008225 | A1 | 1/2002 | Smith | |
| 2005/0256012 | A1 | 11/2005 | Smith | |
| 2006/0003899 | A1 | 1/2006 | Levey et al. | |

FOREIGN PATENT DOCUMENTS

| | | |
|---|---|---|
| CA | 2457698 A1 | 6/2005 |
| GB | 2 433 951 A | 7/2007 |
| WO | 96/23849 A1 | 8/1996 |

OTHER PUBLICATIONS

Official Action issued in corresponding Eurasian Application No. 201170076; Dated Apr. 23, 2012 (6 pages).
Office Action issued in corresponding Canadian Application No. 2,728,166 dated May 10, 2012 (3 pages).
International Search Report from PCT/EP2009/057759 dated Sep. 11, 2009 (3 pages).
Written Opinion from PCT/EP2009/057759 dated Sep. 11, 2009 (9 pages).
Office Action issued in the corresponding European Application No. 09769221.4 dated May 6, 2011 (6 pages).
Office Action issued in corresponding Canadian Application No. 2,728,166 dated Apr. 5, 2013 (2 pages).
Official Action issued in corresponding Eurasian Application No. 201170076 dated Jan. 24, 2013 (4 pages).

* cited by examiner

*Primary Examiner* — Aiqun Li
(74) *Attorney, Agent, or Firm* — Osha • Liang LLP

(57) ABSTRACT

Embodiments disclosed herein relate to methods for stabilizing shales while drilling a wellbore into an earthen formation comprising circulating an aqueous based wellbore fluid in the wellbore while drilling through shales; wherein the aqueous-based wellbore fluid comprises a copolymer of acrylamide-type comonomers and at least one cationic comonomer.

6 Claims, No Drawings

COPOLYMER FOR SHALE STABILIZATION AND METHOD OF USE

BACKGROUND OF INVENTION

1. Field of the Invention

Embodiments disclosed herein relate generally to methods for stabilizing shales during drilling. Even more particularly, embodiments disclosed herein relate to methods of using aqueous based wellbore fluids that contain copolymers of cationic comonomers and acrylamide-type comonomers.

2. Background Art

Hydrocarbons are found in subterranean formations. Production of such hydrocarbons is generally accomplished through the use of rotary drilling technology, which requires the drilling, completing and working over of wells penetrating producing formations.

To facilitate the drilling of a well, fluid is circulated through the drill string, out the bit and upward in an annular area between the drill string and the wall of the borehole. Common uses for wellbore fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

The selection of the type of wellbore fluid to be used in a drilling application involves a careful balance of both the good and bad characteristics of the wellbore fluids in the particular application and the type of well to be drilled. However, historically, aqueous based wellbore fluids have been used to drill a majority of wells. Their lower cost and better environment acceptance as compared to oil based wellbore fluids continue to make them the first option in drilling operations. Frequently, the selection of a fluid may depend on the type of formation through which the well is being drilled.

The types of subterranean formations intersected by a well, include sandstone, limestone, shale, siltstone, etc., many of which may be at least partly composed of clays, including shales, mudstones, siltstones, and claystones. Shale is the most common, and certainly the most troublesome, rock type that must be drilled in order to reach oil and gas deposits. The characteristic that makes shales most troublesome to drillers is its water sensitivity, due in part to its clay content and the ionic composition of the clay.

In penetrating through such formations, many problems may be encountered including bit balling, swelling or sloughing of the wellbore, stuck pipe, and dispersion of drill cuttings. This may be particularly true when drilling with a water-based fluid due to the high reactivity of clay in an aqueous environment. When dry, the clay has too little water to stick together, and it is thus a friable and brittle solid. Conversely, in a wet zone, the material is essentially liquid-like with very little inherent strength and can be washed away. However, intermediate to these zones, the shale is a sticky plastic solid with greatly increased agglomeration properties and inherent strength.

When drilling a subterranean well, as the drill bit teeth penetrate the formation, drill chips are generated by the action of the bit. When these cuttings are exposed to conventional water-based muds, they usually imbibe water and are rapidly dispersed. However recent advances in wellbore fluid technology have developed highly inhibitive muds which appear to reduce the hydration of shale and in doing so produce sticky, plastic shale fragments. These fragments adhere to each other and to the bottomhole assembly and cutting surfaces of the drill bit, gradually forming a large compacted mass of clay on the drilling equipment. This process, or phenomenon, of accumulation and impacting is generally referred to as "balling" or "packing off" of the drilling equipment.

Clay swelling during the drilling of a subterranean well can have a tremendous adverse impact on drilling operations. Bit balling reduces the efficiency of the drilling process because the drillstring eventually becomes locked. This causes the drilling equipment to skid on the bottom of the hole preventing it from penetrating uncut rock, therefore slowing the rate of penetration. Furthermore the overall increase in bulk volume accompanying clay swelling impacts the stability of the borehole, and impedes removal of cuttings from beneath the drill bit, increases friction between the drill bit and the sides of the borehole, and inhibits formation of the thin filter cake that seals formations. Clay swelling can also create other drilling problems such as loss of circulation or stuck pipe and increased viscosity of the wellbore fluid that slow drilling and increase drilling costs. The downtime associated with either soaking the bit or tripping the bit can be very costly and is therefore undesirable.

Thus, given the frequency in which shale is encountered in drilling subterranean wells, there exists a continuing need for methods of drilling using aqueous based wellbore fluids that will reduce potential problems encountered when drilling through shales such as with dispersion of shales, cuttings accretion and agglomeration, cuttings build up, bit balling, and hole cleaning.

SUMMARY OF INVENTION

In one aspect, embodiments disclosed herein relate to methods for stabilizing shales while drilling a wellbore into an earthen formation comprising circulating an aqueous based wellbore fluid in the wellbore while drilling through shales; wherein the aqueous-based wellbore fluid comprises a copolymer of acrylamide-type comonomers and at least one cationic comonomer.

In another aspect, embodiments disclosed herein relate to methods for reducing permeability damage in an earthen formation comprising circulating the aqueous based wellbore fluid while drilling through shales; wherein the aqueous-based wellbore fluid further comprises a copolymer of acrylamide-type comonomer and at least one cationic comonomer; and, wherein the copolymer of acrylamide-type comonomer and at least one cationic comonomer comprises from about 50 to about 95 mole percent acrylamide-type comonomer.

Other aspects and advantages of the invention will be apparent from the following description and the appended claims.

DETAILED DESCRIPTION

In one aspect, embodiments disclosed herein relate to a water-based wellbore fluid for use in drilling wells through a shale including a copolymer of acrylamide-type comonomers and at least one cationic comonomer. Generally the wellbore fluid of the present disclosure may be formulated to include an aqueous continuous phase and a water-soluble copolymer of acrylamide-type comonomers and at least one cationic comonomer. As disclosed below, the fluids of the present disclosure may optionally include additional components, such as weighting agents, viscosity agents, fluid loss control agents, bridging agents, lubricants, corrosion inhibition agents, alkali reserve materials and buffering agents, surfactants and suspending agents, rate of penetration enhancing agents and the like that one of skill in the art would appreciate may be added to an aqueous based wellbore fluid.

The inventor has surprisingly discovered that copolymers of acrylamide-type comonomers and cationic comonomers when added to aqueous wellbore fluids may reduce or prevent dispersion of drilled shale or clay cuttings into the wellbore fluid. The inventor has further surprisingly found that aqueous wellbore fluids including copolymers of acrylamide-type comonomers and cationic comonomers provide control over accretion and/or agglomeration of clay or shale cuttings.

Frequently, the type of wellbore fluid additive used depends on numerous factors inclusive of the type of formation to be encountered, planned depth of the well and the temperatures expected to be encountered downhole. Various polymeric materials are known for incorporation into drilling fluids as shale inhibitors. However, wellbore fluids including copolymers of acrylamide-type comonomers and cationic comonomers have been found to possess unique properties not possessed by either of polyacrylamides or cationic polymers. The use of aqueous drilling fluids containing these copolymers gives better results than the use of polyacrylamides, anionic polyacrylamides and other anionic polymers, especially at high temperatures. The copolymers are also less toxic to marine life than predominantly cationic polymers.

Thus, the copolymers of the present disclosure comprise two different types of comonomers, namely acrylamide-type comonomers and cationic comonomers, which greatly differ in chemical structure. The resultant copolymers have unique chemical and physical properties different from homopolymers of either comonomer component, and therefore have been found to beneficially reduce or prevent dispersion, accretion, and agglomeration of shale and clay cuttings downhole.

Amide-Containing or "Acrylamide-Type" Comonomers

Acrylamide is the monomeric unit of polyacrylamide, and in its polymeric state is often used as a thickener or viscosifiers in drilling fluids. The structure of an acrylamide monomer is represented below.

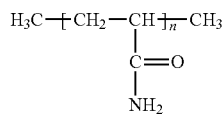

As used herein, the term "acrylamide-type" comonomer refers to monomers containing at least an amide group and a vinyl group for polymerization. In some embodiments, the vinyl group may be part of the amide group. The acrylamide-type comonomers used herein may be an acrylamide comonomer or a substituted acrylamide comonomer, for example, a compound represented by the formula below.

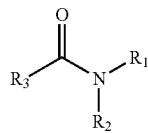

wherein $R_1$ is selected from H, and $C_1$ to $C_4$ alkyl groups;

$R_2$ is selected from H, $C_1$ to $C_4$ alkyl groups, $CH_2CH_2COCH_3$, $—C(CH_3)_2CH_2COCH_3$, $—CH=CH_2$, and $—C(CH_3)=CH_2$ and sodium and potassium salts thereof;

and $R_3$ is selected from H, $C_1$ to $C_4$ alkyl groups, $—CH=CH_2$, and $—C(CH_3)=CH_2$;

wherein when $R_3$ is H or $C_1$ to $C_4$ alkyl groups, then $R_1$ is H, and $R_2$ is $—CH=CH_2$, or $—C(CH_3)=CH_2$;

when $R_3$ is H, $C_1$ to $C_4$ alkyl groups, $—CH_2CH_2COCH_3$, or $—C(CH_3)_2CH_2COCH_3$, then at least one of $R_1$ or $R_2$ is $—CH=CH_2$ or $—C(CH_3)=CH_2$;

and when $R_2$ is $—C(CH_3)_2CH_2COCH_3$ or $—CH_2CH_2COCH_3$, then $R_1$ is H.

For example, some acrylamide-type comonomers useful in embodiments herein are acrylamide, N,N-dimethylacrylamide, and acrylamidoalkylenesulfonic acids such as 2-acrylamido-2-methyl-propane-sulfonic acid. Such acrylamide-type comonomers are substantially non-ionic. Non-ionic polymers are known to have decreased adsorption onto ionic surfaces.

Cationic Comonomers

In addition the acrylamide-type comonomer, the polymers of the present disclosure also include a cationic monomer. As used herein, the term "cationic monomer" refers to any polymerizable compound (i.e., having at least one vinyl group) possessing one or more cationic group. Cationic groups are typically positively charged, having fewer electrons than protons. Accordingly, cationic comonomers, as used herein, are positively charged compounds, with the positive charge being derived from the cationic group. The cationic comonomers may be a nitrogen-based, sulfur-based, or phosphorous-based comonomer, containing ammonium, sulfonium, or phosphonium groups where the positive charge of the cationic group is derived from electron deficient nitrogen, sulfur, or phosphorous atoms, respectively.

The cationic comonomer may also be a single-site cationic, an oligocationic, or a polycationic, comprising one cationic group, a finite number of cationic groups, or a large, often indefinite, number of cationic groups, respectively. Often these cationic comonomers may have anionic groups associated with the cationic group, for balance of charge. These anionic groups are usually easily abstractable, and are often halides. Examples of cationic comonomers useful in wellbore fluids include diallyldimethylammonium halides, diallyldiethylammonium halides, oligodiallyldimethylammonium halides, oligodiallyldiethylammonium halides, polydiallyldimethyl ammonium chloride, polydiallyldiethylammonium halides and any sulfonium or phosphonium derivatives thereof.

Diallyldimethyl ammonium chloride (DADMAC) is a quaternary ammonium cationic monomer. The structure of DADMAC is shown below.

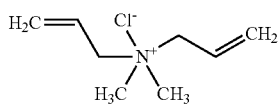

Diallyldimethylammonium halides, especially diallyldimethylammonium chloride (DADMAC) are well-known and commercially available from a variety of sources, and is typically made from the reaction of allyl chloride with dimethyl amine. One method for the preparation of DADMAC is detailed in U.S. Pat. No. 4,151,202, the disclosure of which is incorporated by reference into this specification.

Diallyldimethylammonium halides may be polymerized to yield a pyrolidinium polymer. The structure of a DADMAC repeating unit in a polymer is represented below.

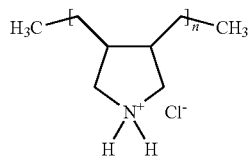

Suitable cationic comonomer to acrylamide-type comonomer ratios for the copolymers of the present disclosure may range from about 5 mole percent cationic comonomer to 95 mole percent acrylamide-type comonomer to about 50 mole percent cationic comonomer to 50 mole percent acrylamide-type comonomer. In a particular embodiment, the ratio of cationic comonomer to acrylamide-type comonomer may range from 15 mole percent cationic comonomer to 85 mole percent acrylamide-type comonomer to about 30 mole percent cationic comonomer to 70 mole percent acrylamide-type comonomer to about 20 mole percent cationic comonomer to 80 mole percent acrylamide-type comonomer. However, one skilled in the art would appreciate that other ranges may also be used.

The copolymers of the present disclosure are of low to medium molecular weight and may be less than 1 million daltons. "Molecular weight," as used herein refers to weight average molecular weight, and may be measured by any method known in the art, such as gel permeation chromatography (GPC). In some embodiments, the molecular weight of the copolymer may be 700,000 daltons or less, 500,000 daltons or less, 200,000 daltons or less, or 100,000 daltons or less. In particular embodiments the molecular weight of the copolymer may range from 100,000 to 1,000,000 daltons. Without wishing to be bound by theory, it is believed that polymers of lower molecular weight may more effectively bind to shale surfaces by allowing the polymer to align itself closer to the shale surface.

The copolymers of cationic comonomers and acrylamide-type comonomers may be synthesized in any manner known in the art. The comonomer units may be used in any sequence in the copolymers. The copolymers may be random, block, or graft polymers. The copolymer may also be purchased from commercial sources. The copolymers used herein are substantially non-ionic with discrete cationic sites along the polymer backbone. This results in a weakly cationic copolymer which may interact with shales in an advantageous manner.

The characteristic that makes shales most troublesome to drillers is its water sensitivity, due in part to its clay content and the ionic composition of the clay. These reactive shales contain clays that have been dehydrated over geologic time by overburden pressure. When the shale is exposed during the drilling process, the clays osmotically imbibe water from the drilling fluid.

Clay minerals are generally crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces. Each unit layer is composed of multiple sheets, which may include octahedral sheets and tetrahedral sheets. Octahedral sheets are composed of either aluminum or magnesium atoms octahedrally coordinated with the oxygen atoms of hydroxyls, whereas tetrahedral sheets consist of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms. The unit layers stack together face-to-face and are held in place by weak attractive forces. The distance between corresponding planes in adjacent unit layers is called the d-spacing. A clay crystal structure with a unit layer consisting of three sheets typically has a d-spacing of about $9.5 \times 10^{-7}$ mm.

In clay mineral crystals, atoms having different valences commonly will be positioned within the sheets of the structure to create a negative potential at the surface, which causes cations to be adsorbed thereto. These adsorbed cations are called exchangeable cations because they may chemically trade places with other cations when the clay crystal is suspended in water. In addition, ions may also be adsorbed on the clay crystal edges and exchange with other ions in the water.

Exchangeable cations found in clay minerals are reported to have a significant impact on the amount of swelling that takes place. The exchangeable cations compete with water molecules for the available reactive sites in the clay structure. Generally cations with high valences are more strongly adsorbed than ones with low valences. Thus, clays with low valence exchangeable cations will swell more than clays whose exchangeable cations have high valences.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's d-spacing thus resulting in an increase in volume. Two types of swelling may occur: surface hydration and osmotic swelling.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers, which results in an increased d-spacing. Virtually all types of clays swell in this manner.

Osmotic swelling is a second type of swelling. Where the concentration of cations between unit layers in a clay mineral is higher than the cation concentration in the surrounding water, water is osmotically drawn between the unit layers and the d-spacing is increased. Osmotic swelling results in larger overall volume increases than surface hydration. However, only certain clays, like sodium montmorillonite, swell in this manner.

When water molecules enter the lattice structure and bond with active sites, the layers expand or eventually disperse into individual particles. Dispersion of clay increases the surface area which in turns causes the clay-water site to expand, and the clay-water suspension to thicken. This leads to swelling of the shale, induced stresses, loss of mechanical strength, and shale failure. Stress increases can induce brittle or tensile failure of the formations, leading to sloughing, cave in, and stuck pipe. Volume increases reduce the mechanical strength of shales and cause swelling of wellbore, disintegration of cuttings in drilling fluid. Shale failure may lead to shale crumbling into the borehole which places an undue burden on the drill bit. For example, the swelled excavated earth may adhere to the walls of the wellbore and of the drilling equipment and form a compact hard mass which gradually fills the entire wellbore annulus thus reducing the effectiveness of the drilling bit.

Furthermore, shale cuttings which are partially hydrated are typically dispersed into the aqueous based drilling fluid, or may become tacky and exhibit accretion and/or agglomeration. Dispersion of clay into the aqueous based drilling fluid may cause the drilling fluid to thicken. Accretion is the mechanism whereby partially hydrated cuttings stick to parts of the bottomhole assembly and accumulate as a compact, layered deposit. This can have an appreciable adverse impact on drilling operations. Deposits on the bottomhole assembly may reduce the efficiency of the drilling process because the drillstring eventually becomes locked. This in turn may cause the drilling equipment to skid on the bottom of the hole preventing it from penetrating uncut rock, therefore slowing the rate of penetration. Also, partially hydrated shale cuttings may stick together or agglomerate forming clusters in the wellbore fluid. Agglomeration may lead to increases in plastic viscosity, yield point, and gel strength of the wellbore fluid.

Without wishing to be limited by theory, it is believed that the copolymers of cationic comonomers and acrylamide-type comonomers in the wellbore fluids disclosed herein act by coating and/or penetrating the shale or clay cuttings and changing the surface character of the cuttings. These high valence cationic copolymers may exchange with the exchangeable cations found on the surface of the shale or clay cuttings. The shale cuttings coated by the cationic comonomer/acrylamide-type comonomer copolymer are more strongly adsorbed to the shale surface than the replaced cations and as such may not readily exchange with water molecules. Further, the surface of the coated shale presented to the well environment is substantially non-ionic. This inhibits osmotic swelling and aids the retention of shale internal structure. Consequently swelling and disintegration is reduced. Furthermore, these substantially nonionic cuttings may not tend to agglomerate due to the neutral ionic character of the coated surface. Accordingly, accretion and agglomeration may also be reduced.

In applications where the copolymers of cationic comonomers and acrylamide-type comonomers are added to wellbore fluids to provide control over dispersion, accretion, and/or agglomeration of shale cuttings, the wellbore fluid may be prepared in a wide variety of formulations. Specific formulations may depend on the stage of drilling at a particular time, for example, depending on the depth and/or the composition of the earthen formation. The copolymers of cationic comonomers and acrylamide-type comonomers may be added to the wellbore fluid as a polymer solution or a polymer suspension. In some embodiments, the polymer may be dissolved in a suitable solvent to form a polymer solution and then added to the wellbore fluid. In other embodiments, the polymer may not readily dissolve in the solvent of choice, and may be suspended or comminuted and suspended, in a suitable solvent, to form a polymer suspension which is then added to the wellbore fluid.

The amounts of copolymers of cationic comonomers and acrylamide-type comonomers in the wellbore fluid may be varied depending on the desired application. For example, the copolymers of cationic comonomers and acrylamide-type comonomers may range from about 0.1 to about 20.0 wt % of the total weight of the wellbore fluid. In another example, copolymers of cationic comonomers and acrylamide-type comonomers may range from about 0.2 to 10.0 wt % of the total weight of the wellbore fluid, and from about 0.3 to 5.0 wt % in yet another example.

The wellbore fluids including copolymers of cationic comonomers and acrylamide-type comonomers may also be used as drilling and reservoir fluids as well as workover and completion fluids. Accordingly, all references to drilling fluids should be interpreted accordingly. In particular embodiments, the wellbore fluid is as a drilling or reservoir fluid.

The wellbore fluids of the present disclosure may have an aqueous fluid as the base fluid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of monovalent cations of metals such as cesium, potassium, and/or sodium, and/or halide or carboxylate salts of divalent cations of metals, such as calcium, magnesium or zinc.

Further, embodiments of the present disclosure may further use "specialty" brines that include at least one alkali metal salt of a transition metal oxy-anion or polyoxyanion, such as, for example, an alkali metal polytungstate, an alkali metal heteropolytungstate, an alkali metal polymolybdate or an alkali metal heteropolymolybdate. Specifically, these specialty brine solutions (which are typically used in high temperature applications) comprise aqueous solutions of transition metal salts, wherein the aqueous solution contains anionic moieties having the formula $[A^{n+}B_mO_k]^{x-}$, where (A) is selected from group IV elements, group V elements, transition metal elements, and rare earth elements; (B) is one or more transition metal elements having an atomic weight between 50 and 201 inclusive, O is oxygen, m is an integer between 6 and 18 inclusive, k is an integer between 24 and 62 inclusive, and x is a small integer, typically between 1 and 10 depending on the selections of A, B, m, and k, and where the cations may be lithium, sodium, potassium, cesium, or a mixture thereof, or with a small amount of hydrogen cations provided by free acid anionic moieties, and especially where said salts are a major component of the solution and not merely an additive thereto. In particular embodiments of the present disclosure may use, the sodium, potassium, and cesium salts of the heteropolytungstates and the blends of these salts with the heteropolytungstic acids. Specific examples of such brines may be found in PCT International Publication No. WO 2007/005499, which is assigned to the present assignee and incorporated by reference herein in its entirety.

Further, one skilled in the art would recognize that in addition to copolymers of cationic comonomers and acrylamide-type comonomers, other additives may be included in the wellbore fluids disclosed herein, for instance, weighting agents, viscosifiers, wetting agents, corrosion inhibitors, oxygen scavengers, anti-oxidants and free radical scavengers, biocides, surfactants, dispersants, interfacial tension reducers, pH buffers, mutual solvents and thinning agents.

Weighting agents or density materials suitable for use in the fluids disclosed herein include, for example, galena, hematite, magnetite, iron oxides, illmenite, barite, siderite, celestite, dolomite, calcite, and the like. The quantity of such material added, if any, depends upon the desired density of the final composition. Typically, weight material is added to result in a wellbore fluid density of up to about 19 ppg in one embodiment; and ranging from 9.5 to 14 ppg in another embodiment.

Deflocculants or thinners that may be used in the wellbore fluids disclosed herein include, for example, lignosulfonates, modified lignosulfonates, polyphosphates, tannins, and low molecular weight water soluble polymers, such as polyacrylates. Deflocculants are typically added to a wellbore fluid to reduce flow resistance and control gelation tendencies.

A wellbore fluid according to the disclosure may be used in a method for drilling a well into a subterranean formation in a manner similar to those wherein conventional wellbore fluids are used. In the process of drilling the well, a wellbore fluid is circulated through the drill pipe, through the bit, and up the annular space between the pipe and the formation or steel casing to the surface. The wellbore fluid performs several different functions, such as cooling the bit, removing drilled cuttings from the bottom of the hole, suspending the cuttings and weighting the material when the circulation is interrupted.

The copolymers of cationic comonomers and acrylamide-type comonomers may be added to the base fluid on location at the well-site where it is to be used, or it can be carried out at another location than the well-site. If the well-site location is selected for carrying out this step, then the copolymers of cationic comonomers and acrylamide-type comonomers may immediately be dispersed in a brine, and the resulting wellbore fluid may immediately be emplaced in the well using techniques known in the art.

Where the copolymers of cationic comonomers and acrylamide-type comonomers are added to the wellbore fluid at a "pre-manufacture" site remote from the well-site, the cationic comonomer/acrylamide-type comonomer copolymers may be dispersed in a brine, such as, for example, a 14.2 ppg $CaBr_2$-based brine, and the resultant wellbore fluid may be packaged in 5-gallon buckets which are palletized and shipped to the well-site. Further, one skilled in the art would appreciate that the copolymers may also be provided in a heavier mud, which is then cut to the desired density at the well site. Alternatively, the copolymers of cationic comonomers and acrylamide-type comonomers of the present disclosure may also be pre-formulated into a dry polymer particulate system, and provided for use at the well-site in user friendly packaging.

The copolymers of cationic comonomers and acrylamide-type comonomers may be dissolved in the aqueous fluid. The polymer is chosen to ensure that it is soluble in the aqueous fluid in the amounts required for the application in which it is to be used. Various factors can affect solubility of the polymer. These include choice of comonomer or comonomers within the copolymer and molecular weight of the copolymer.

Wellbore fluids of the present disclosure containing copolymers of cationic comonomers and acrylamide-type comonomers may be emplaced into the wellbore using conventional techniques known in the art. The copolymers of cationic comonomers and acrylamide-type comonomers may be added to the drilling, completion, or workover fluid. The wellbore fluids described herein may be used in conjunction with any drilling or completion operation.

Advantageously, embodiments of the present disclosure provide methods of drilling using wellbore fluids including copolymers of cationic comonomers and acrylamide-type comonomers. Use of wellbore fluids containing copolymers of cationic comonomers and acrylamide-type comonomers may be effective in preventing dispersion of shale cuttings into the wellbore fluid. Further, wellbore fluids including copolymers of acrylamide-type comonomers and cationic comonomers may also be effective in preventing accretion and/or agglomeration of shale cuttings downhole. Even further, wellbore fluids including copolymers of copolymers of acrylamide-type comonomer and cationic comonomers are inherently biodegradable when compared to homopolymers of either cationic comonomers or acrylamide-type comonomer alone. The copolymers of cationic comonomers and acrylamide-type comonomers may be inherently biodegradable. Specifically, the discrete portions of the cationic comonomer found along the copolymer backbone may render the copolymer biodegradable by microbes under aerobic conditions. Homopolymers of DADMAC have not been found to be as readily biodegradable under similar conditions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:
1. A method for stabilizing shales while drilling a wellbore into an earthen formation comprising:
   circulating an aqueous based wellbore fluid in the wellbore while drilling through shales;
   wherein the aqueous-based wellbore fluid comprises:
      a copolymer of acrylamide-type comonomers and from about 5 mole % to about 10 mole % of one or more cationic comonomers, the copolymer having a molecular weight of less than about 1,000,000 daltons wherein the one or more cationic comonomers are selected from at least one of diallyldimethylammonium chloride and diallyldiethylammonium chloride and wherein the acrylamide-type comonomer has the chemical formula:

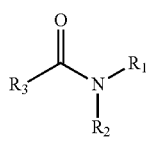

where $R_1$ is selected from H, and $C_1$ to $C_4$ alkyl groups; $R_2$ is selected from H, $C_1$ to $C_4$ alkyl groups, $CH_2CH_2COCH_3$, $-C(CH_3)_2CH_2COCH_3$, $-CH=CH_2$, and $-C(CH_3)=CH_2$; and $R_3$ is selected from a group consisting of $-CH=CH_2$, and $-C(CH_3)=CH_2$, wherein $R_1$ and $R_2$ are not simultaneously H.

2. The method of claim 1, wherein the copolymer of acrylamide-type comonomers and one or more cationic comonomers is added as a polymer solution or a polymer suspension to the wellbore fluid.

3. The method of claim 1, wherein the wellbore fluid comprises the copolymer of acrylamide-type comonomer and at least one cationic comonomer in an amount up to 20 weight percent.

4. A method for reducing permeability damage in an earthen formation comprising:
circulating an aqueous based wellbore fluid while drilling through shales, wherein the aqueous-based wellbore fluid comprises:
a copolymer of acrylamide-type comonomer and from about 5 mole % to about 10 mole % of one or more cationic comonomers, wherein the one or more cationic comonomers are selected from at least one of diallyldimethylammonium chloride and diallyldiethylammonium chloride and wherein the acrylamide-type comonomer has the chemical formula:

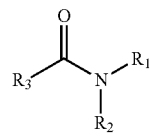

where $R_1$ is selected from H, and $C_1$ to $C_4$ alkyl groups; $R_2$ is selected from H, $C_1$ to $C_4$ alkyl groups, $CH_2CH_2COCH_3$, $-C(CH_3)_2CH_2COCH_3$, $-CH=CH_2$, and $-C(CH_3)=CH_2$ and sodium and potassium salts thereof; and $R_3$ is selected from a group consisting of $-CH=CH_2$, and $-C(CH_3)=CH_2$, wherein $R_1$ and $R_2$ are not simultaneously H; and wherein the copolymer of acrylamide-type comonomer and one or more cationic comonomers comprises about 95 mole percent acrylamide-type comonomer, and wherein the copolymer has a molecular weight of less than about 1,000,000 daltons.

5. The method of claim 4, wherein the copolymer of acrylamide-type comonomers and one or more cationic comonomers is added as a polymer solution or a polymer suspension to the wellbore fluid.

6. The method of claim 4, wherein the wellbore fluid comprises the copolymer of acrylamide-type comonomer and at least one cationic comonomer in an amount up to 20 weight percent.

\* \* \* \* \*